United States Patent [19]
Woodward et al.

[11] 4,118,997
[45] Oct. 10, 1978

[54] BEVEL GEARING

[75] Inventors: Clifford Stanley Woodward, Bristol; David Roberts McMurtry, Wotton-under-Edge, both of England

[73] Assignee: Rolls-Royce Limited, England

[21] Appl. No.: 824,617

[22] Filed: Aug. 15, 1977

[30] Foreign Application Priority Data

Aug. 14, 1976 [GB] United Kingdom ............... 33910/76

[51] Int. Cl.² .......................... F16H 1/14; F16H 37/06
[52] U.S. Cl. .................................... 74/417; 74/665 B; 74/665 GB
[58] Field of Search ...................... 74/417, 423, 665 B, 74/665 GB

[56] References Cited

U.S. PATENT DOCUMENTS

| 3,374,687 | 3/1968 | Vogt | 74/417 |
| 3,959,850 | 6/1976 | Crane | 74/665 GB X |

Primary Examiner—Leonard H. Gerin
Attorney, Agent, or Firm—Stevens, Davis, Miller & Mosher

[57] ABSTRACT

A bevel gear assembly for transmitting high horsepowers between a first shaft and a second shaft the axis of which lies at an angle to the first shaft includes a main bevel gear mounted on the first shaft and having two circumferential rows of teeth. The teeth face axially in opposite directions and a pair of secondary bevels are provided meshing respectively with the two rows of teeth. The secondary bevels are coupled to drive the second shaft.

6 Claims, 5 Drawing Figures

BEVEL GEARING

The present invention relates to bevel gearing for transmitting power from a first shaft to another shaft rotating about an axis at an angle to the axis of the first shaft.

It is known, for example, in gas turbine engine accessory drives, to take power from the engine main shaft to auxiliary shafts rotating at right angles to the main shaft using bevel gears. Usually a single bevel gear connected to the main shaft is arranged to mesh with a single bevel gear on the second shaft.

However, there are limitations on the amount of horse-power which can be transmitted in this way because the size of the bevel teeth increases significantly as horsepower transmitted increases, so that the weight of the gearing increases rapidly. Further, the loads produced on the gear teeth cause an end load on the gear on the main shaft which, because the gear is usually of significant diameter, requires the gear to be of considerable strength as the horsepower transmitted increases. Again this adds to the weight of the gearing.

In gas turbine engines for aircraft, where weight is at a premium the weight of such assemblies rapidly becomes prohibitive as the power required to be transmitted increases.

It is an object of the present invention to provide bevel gearing capable of transmitting high horsepowers i.e. 2,000 horsepower and more, the weight of which is relatively low and acceptable for gas turbine engine applications.

According to the present invention there is provided a bevel gearing assembly comprising a first shaft to which is connected a main bevel gear having two circumferentially extending rows of teeth facing in opposite axial directions, and two secondary bevel gears meshing respectively with the two rows of teeth on the main bevel gear, the two secondary bevel gears being coupled to drive a second shaft the axis of which lies at an angle to the axis of the first shaft.

By sharing the loads between two secondary bevels the sizes of the teeth on all the gears can be significantly reduced to the extent that there is an overall weight saving.

The coupling means may be a gear connected to one of the secondary bevels and driving the shaft through a gear on the shaft either directly or through a gear train, and similarly the other secondary bevel may be connected directly on the shaft, or may also be coupled to the shaft through an additional gear or gear train.

In a preferred form of the invention the two secondary bevels are mounted on opposite sides of the main bevel which has teeth on both sides.

By this means the end loads produced by the secondary bevels on the main bevel are cancelled and the main bevel can be formed on a relatively lightweight disc or diaphragm thereby allowing a further saving in weight.

In an alternative embodiment the rows of bevel teeth are formed on axially spaced flanges on the shaft, or on a cylindrical member connected thereto, and the teeth face towards each other. The secondary bevels thus lie between the flanges and the second shaft can lie at an acute angle to the first shaft.

In order to provide for load sharing between the main bevel and the secondary bevels, means are provided for allowing limited relative movements between the gears, either by fixing the main bevel against movement along its shaft axis and mounting the secondary bevels so that they are capable of sufficient movements, or by rigidly mounting the secondary bevels and allowing for movement of the main bevel.

The invention will now be more particularly described with reference to the accompanying drawings in which.

Figure 1:
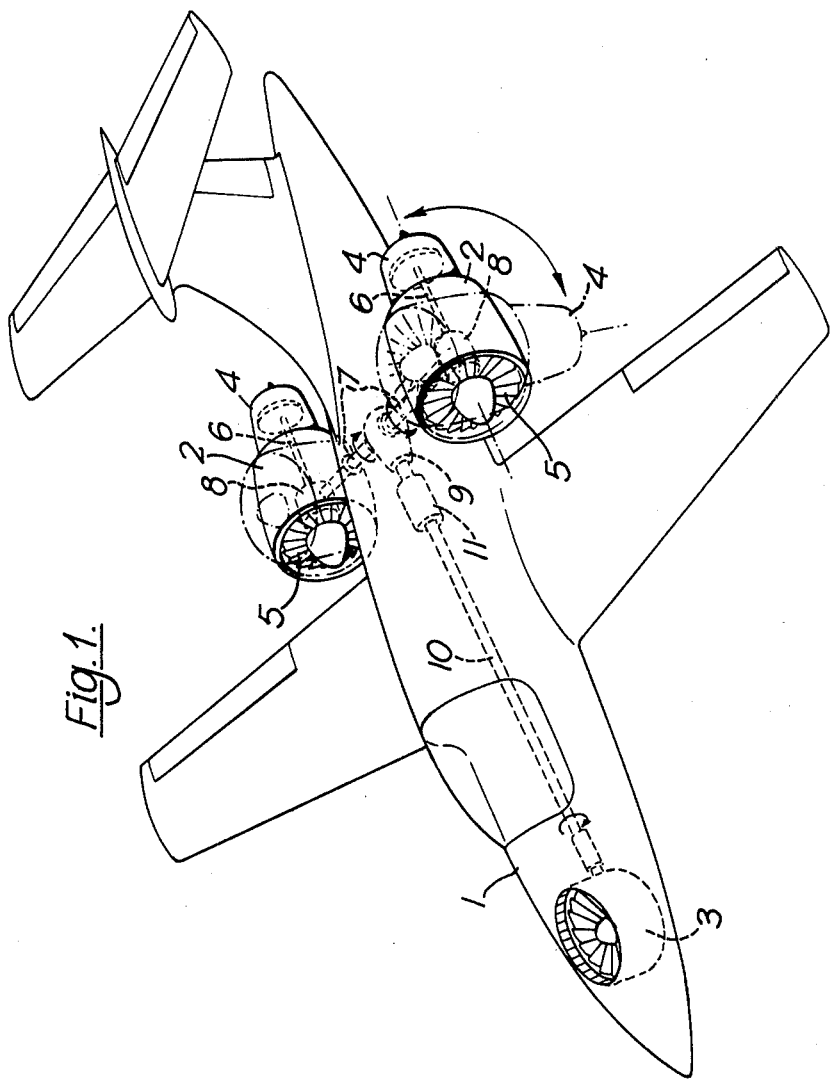
FIG. 1 is a pictorial view of an aircraft having multiple ducted fans driven by engines and interconnected by means of bevel gearing assemblies of the present invention.

Referring now to the drawings there is shown in FIG. 1 an aeroplane 1 having two rear-mounted ducted fan engines 2 and a forward fan 3 which is mounted with its axis vertical to provide a lift thrust on the aircraft. The rear-mounted engines are mounted for pivoting about a transverse axis to provide lift thrust for vertical or short take-off and landing.

Each of the engines 2 comprises a core gas generator 4 which may be of any conventional design, and which drives a ducted fan 5 which is of variable pitch. The concept of such an aircraft engine and fan lay-out has been previously proposed and forms no part of the present invention.

However, in such an aircraft it is necessary to provide means for driving the front fan 3 from both of the engines, and also to provide for either engine to be capable of driving the fan of the other engine as well as the fan 3 in the event of an engine failure. Such drives will involve the use of bevel gearing and the present invention concerns a novel bevel gearing assembly to solve this problem, although clearly the present bevel gearing may have uses in other fields such as power generation, and is not limited to gas turbine engine applications.

The main features required of the bevel gear drives for the present aircraft application are that they should be capable of transmitting a significant proportion of the power of the core gas generators, which can be between 5,000 and 10,000 horsepower, to the fan shaft and yet not be excessively heavy.

The arrangement of the shafting to achieve this power transmission can be seen in FIG. 1 to include a main shaft 6 for each engine by which means the core gas generator 4 drives its respective fan 5. A dis-engageable coupling (FIG. 3) is included between the fan and core gas generator in each engine so that the core gas generator can be disconnected from the fan in the event of its failure. Each main shaft 6 drives a power take-off shaft 7 via a bevel gearing assembly 8, and the two shafts 7 drive into a Tee junction gear box 9 the output of which drives the fan shaft 10. This shaft also includes a clutch arrangement 11 so that the fan 3 can be disconnected when not required.

Figure 2:
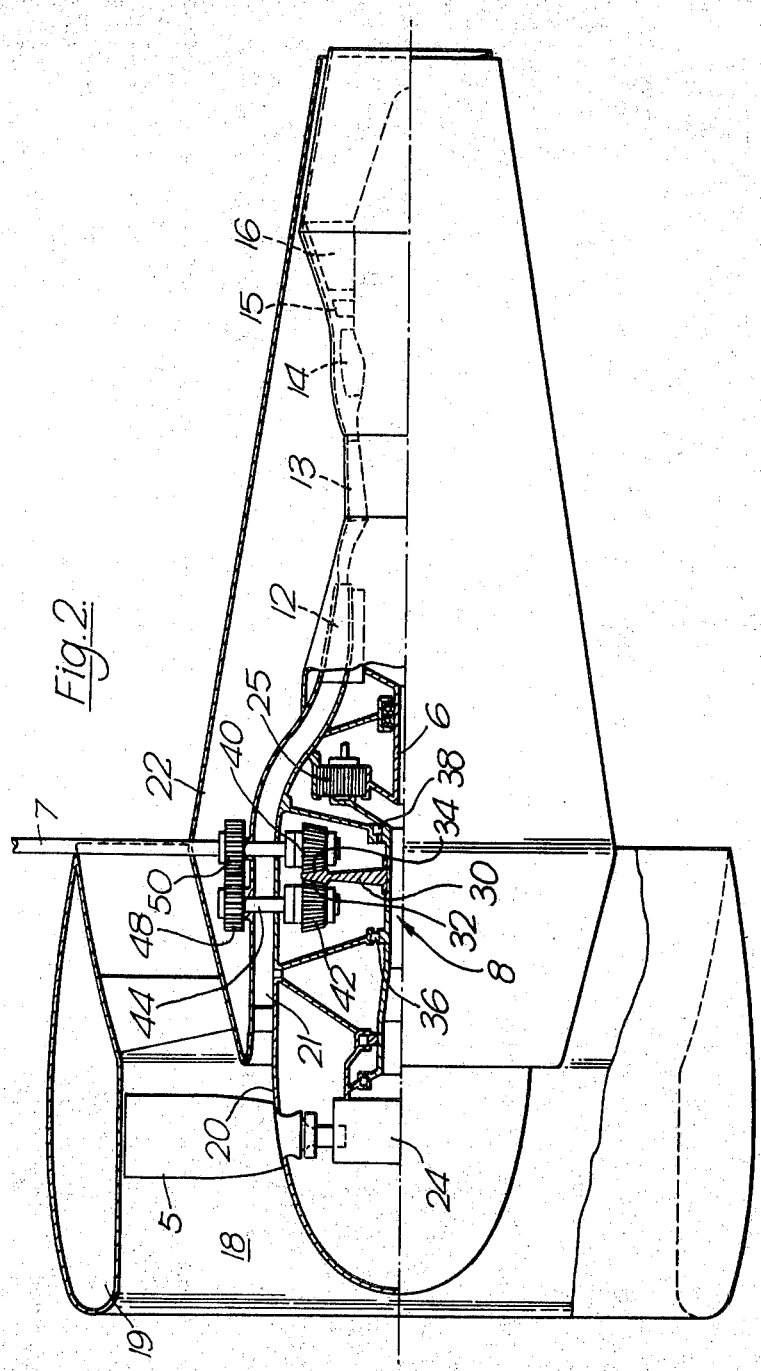
FIG. 2 is a detailed section through one of the engines of the aircraft FIG. 1 showing the bevel gearing assembly.

The novel bevel gearing assembly 8 for transmitting this high power between the engines and fans is shown in FIG. 2 which illustrates one of the engines 2.

The core gas generator of each engine 2 is a conventional two shaft gas generator including in flow series a low pressure compressor 12, a high pressure compressor 13, combustion equipment 14, a high pressure turbine 15 and a low pressure turbine 16. The high pressure compressor and turbine are drivingly connected by a high pressure shaft (not shown) in conventional manner and the low pressure turbine and compressor are drivingly connected by a low pressure shaft, which in this embodiment constitutes the engine main shaft 6.

The shaft 6 also drives the fan 5, which is mounted in a duct 18 defined between the radially inner wall of a cowl 19 which surrounds the fan, and the radially inner casing 20 of the core gas generator. Part of the air flow compressed by the fan passes into an annular passage 21 defined between the inner casing 20 and an inner wall of the gas generator outer casing 22.

The fan 5 is a variable pitch fan, the pitch-changing mechanism 24 of which may be of any suitable known type.

The fan 5 is driven by the shaft 6 through a reduction gear 25 and the bevel gear assembly 8, although there is no speed reduction across the bevel gear assembly. The bevel gear assembly 8 is disposed on the low speed side of the reduction gear so that in the event of a failure of the core gas generator, the other core gas generator may be coupled to drive the fan 5 through the bevel gear assembly, without having to drive the reduction gear also.

The bevel gear assembly can be seen to include a main bevel gear 30 which has two circumferential rows of teeth 32 and 34 on its opposite sides. The main bevel gear 30 is mounted on the drive shaft 6 between the reduction gear 25 and the fan 5, and is supported in bearings 36 and 38 from the engine casing 20 in a manner which will be more fully described with reference to FIGS. 3 and 4.

A pair of secondary bevel gears 40 and 42 mesh with the rows of teeth 32 and 34 on the opposite sides of the main bevel gear 30.

The bevel gear 40 drives the shaft 7 which connects with the gear box 9, and the other bevel 42 drives an auxiliary shaft 44 which carries a spur gear 48 which meshes with another spur gear 50 carried by shaft 7 to couple the two bevel gear drives together and provide a single output on shaft 7. The coupling of the two bevel gear drives can take any convenient form depending on the space available. As shown, the coupling is effected with the spur gears 48, 50 in the space between the inner and outer walls of the core gas generator outer casing 22. Alternatively however, if space is available within the inner casing 20 the bevel gear 48 and the spur gear 54 may be combined into a single compound gear wheel. In a further alternative the shaft 44 may extend across the fan duct 18 and the spur gears and their support structure may be disposed within the cowl 19 which defines the fan duct.

Figure 3:
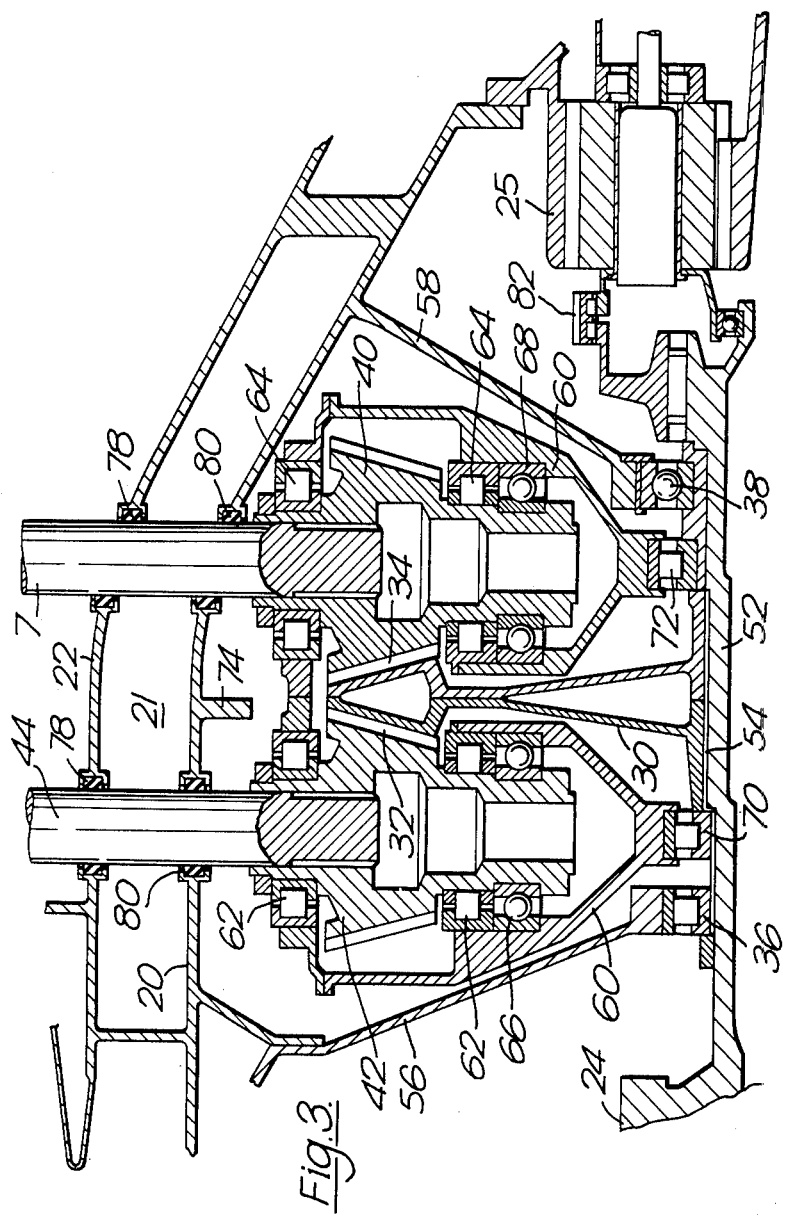
FIG. 3 is an enlarged sectional elevation of the bevel gearing assembly of FIG. 2.
Figure 4:
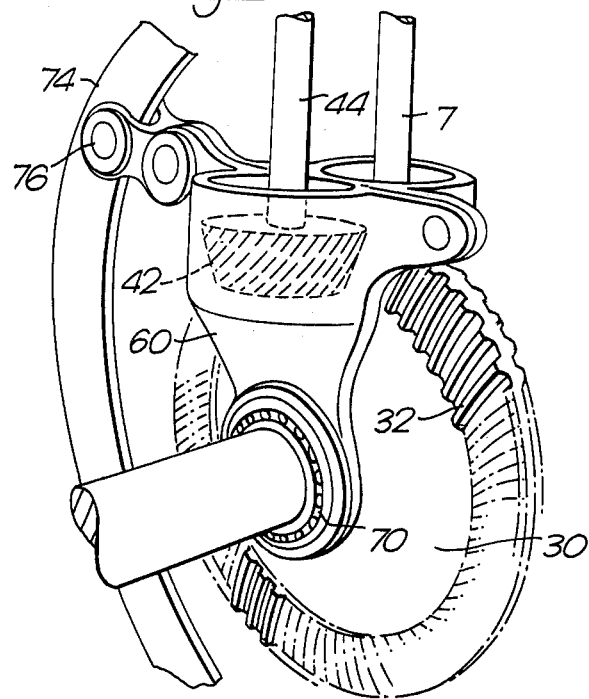
FIG. 4 is a pictorial view of the bevel gearing assembly.

Referring now to FIGS. 3 and 4, greater detail of the bevel gearing assembly is shown. The main bevel gear 30 is mounted on a portion 52 of the shaft 6 by means of a splined connection 54 so as to rotate with the shaft 6. The shaft portion 52 is supported in the bearings 36 and 38 by support cones 56 and 58 from the inner casing 20. Bearing 38 is a ball bearing which locates the shaft relative to the casing and bearing 36 is a roller bearing which allows for relative thermal expansion between the shaft portion 52 and the casing 20. The axial position of the main bevel 30 is accurately maintained by clamping splines 54 between the bearings 36 and 38. The only axial movement of the bevel 30 relative to the bevels 40 and 42 will be that which is due to the differential thermal expansion between the shaft portion 52 and the casing 20 over the length between the bearing 38 and the bevel gear 30, which is relatively small.

In order to allow for load sharing between the bevels 40, 42 and the main bevel 30, the bevels 40, 42 are mounted in a carrier 60 and are supported for rotation in the carrier on roller bearings 62, 64 and ball bearings 66, 68 respectively. The carrier is supported from shaft portion 52 by roller bearings 70, 72, one on each side of the bevel gear 30 which allow for axial movement of the carrier 60 relative to the bevel gear 30.

The torque reaction on the carrier 60 is taken into a flange 74 on the casing 20 by a link 76 (FIG. 4).

If necessary, seals indicated at 78 and 80 are provided to prevent leakage of air between the gas passages 21, 18 and the casing 22.

The bevel gear assembly above-described is capable of transmitting horsepowers between the engine gas generators and the fans while being relatively lightweight because number of teeth compared to a single-sided bevel gear is doubled, and because the bending loads in the bevel gear wheel 30 due to the meshing of the bevels 40 and 42 on opposite sides cancel out. The sizes of the teeth and of the bevel 30 can therefore be reduced.

To allow for failure of the core engine, a dis-engageable coupling 82 is provided in the form of a slideable toothed sleeve which engages teeth 84, 86 on the end of the shaft portion 52 and on the output drive collar 88 of the reduction gear 25 respectively.

Figure 5:
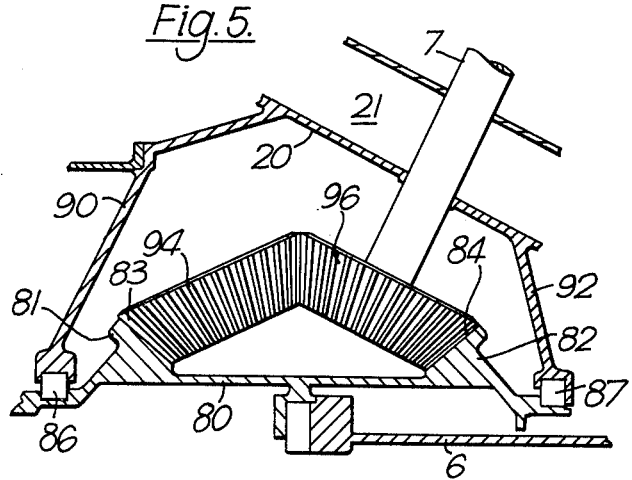
FIG. 5 is a section through an alternative arrangement of the gears and shafting of the bevel assembly.

In the alternative embodiment illustrated in FIG. 5 the main bevel gear is in the form of an annular channel-shaped member 80 the end flanges 81, 82 of which are each formed with a circumferential row of teeth 83, 84 which face towards each other. The member 80 is carried in bearings 86, 88 supported from the engine casing 20 by support cones 90, 92 and is driven from the engine main shaft 6 through a splined joint at 93.

The secondary bevels 94, 96 in this embodiment are disposed between the end flanges 81, 82 and mesh with the teeth 83, 84 and with each other. With this arrangement the gear ratio between the main bevel and the secondary bevels determines the angle at which the bevels lie and hence the angle of the shaft 7. This can be useful in giving more freedom of choice in the positioning of the pivot point of the engines and of the bevel gear assembly within the engine.

The shaft 7 and the bevel gear 94 are mounted in bearings 98, 100 and 102, 104 respectively which in turn are supported from the engine casing 20.

In a modification to the arrangement of FIG. 5, and shaft 7 may be perpendicular to the axis of the shaft 6 provided an additional idler bevel is provided in between the bevels 94 and 96 so that they mesh on opposite sides of the idler bevel instead of with each other.

Clearly the bevel gear assemblies described above can be used, where applicable, in any multi-engined aircraft configuration in which drives of high horsepower are to be transmitted between engines, or from engines to additional fans, and the aircraft of FIG. 1 is to be considered only as exemplary of such configurations.

We claim:

1. A bevel gearing assembly comprising a first shaft, a main bevel gear connected to the first shaft and having two circumferentially extending rows of teeth facing in opposite axial directions, and two secondary bevel gears meshing respectively with the two rows of teeth on the main bevel gear, the two secondary bevel gears being coupled to drive a second shaft the axis of which lies at an angle to the axis of the first shaft.

2. A bevel gearing assembly as claimed in claim 1 and in which the main bevel gear has a circumferential row of teeth on both of its opposite sides and the secondary bevel gears are mounted one on each side of the main bevel to mesh with said teeth.

3. A bevel gearing assembly as claimed in claim 2 and in which one of the secondary bevel gears is mounted on the second shaft and the second bevel gear is connected to drive a spur gear which meshes with a spur gear mounted on said second shaft.

4. A bevel gearing assembly as claimed in claim 1 and in which the main bevel has two axially spaced flanges each having a circumferential row of teeth facing the other flange, and the secondary bevels are mounted in between the flanges so as to mesh respectively with one of the rows of teeth.

5. A bevel gearing assembly as claimed in claim 4 and in which the two secondary bevels mesh with each other and the second shaft lies at an acute angle to the first shaft.

6. A bevel gearing assembly as claimed in claim 4 and in which the two secondary bevels mesh with an intermediate idler gear and the second shaft lies at right angles to the axis of the first shaft.

* * * * *